Aug. 22, 1950 M. W. DE HART ET AL 2,519,746

TELEPHONE SUPPORT

Filed July 1, 1947 2 Sheets-Sheet 1

Inventor

Walter I. White

Melrose W. DeHart

By Clarence A. O'Brien and Harvey B. Jacobson

Attorneys

Inventor
Walter I. White
Melrose W. De Hart

By Clarence A. O'Brien,
and Harvey B. Jacobson,
Attorneys

Patented Aug. 22, 1950 2,519,746

UNITED STATES PATENT OFFICE 2,519,746

TELEPHONE SUPPORT

Melrose W. De Hart, Little Rock, and Walter I. White, North Little Rock, Ark.

Application July 1, 1947, Serial No. 758,414

7 Claims. (Cl. 179—149)

The present invention relates to new and useful improvements in supports for the combined transmitter and receiver of French type dial telephones and has for its primary object to support the combined transmitter and receiver in any desired position when the latter is removed from its cradle and the switch is closed to thus leave the hands free for other purposes.

An important object of the present invention is to provide a support of this character including a flexible supporting arm which may be adjusted and automatically held in a desired horizintally or vertically adjusted position.

A further object of the invention is to provide means for supporting the arm on the base of the telephone and embodying means operated by a sliding movement of the arm to open and close the circuit for the telephone.

A still further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
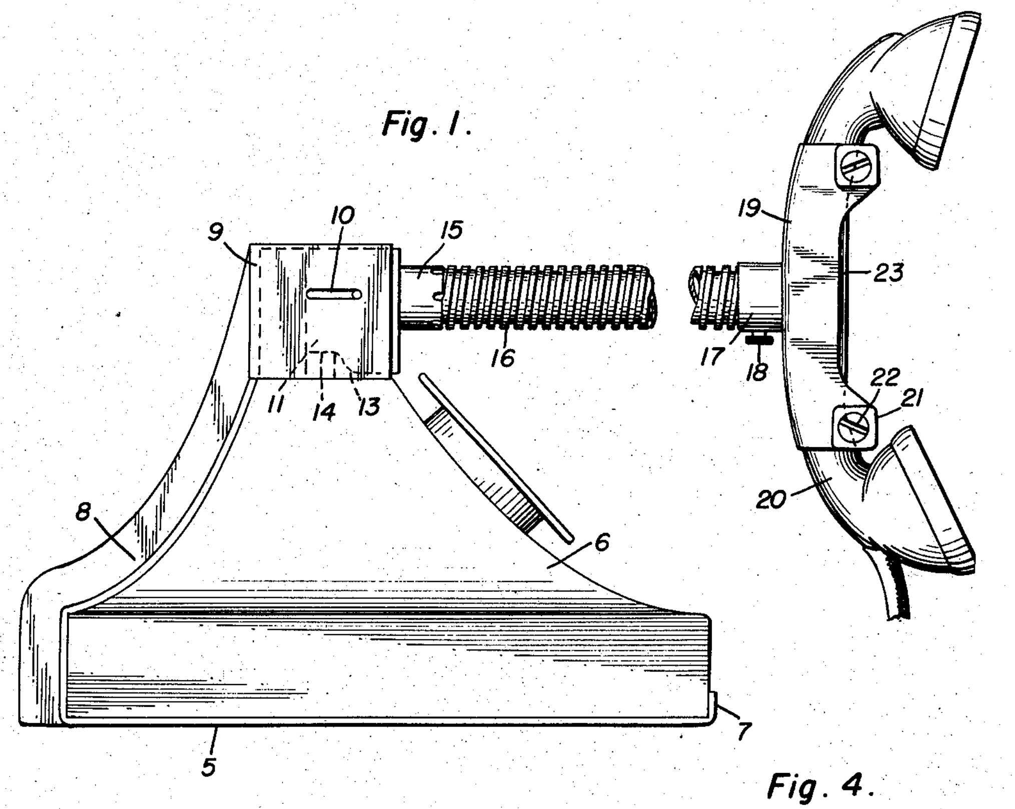
Figure 1 is a side elevational view.
Figure 4:
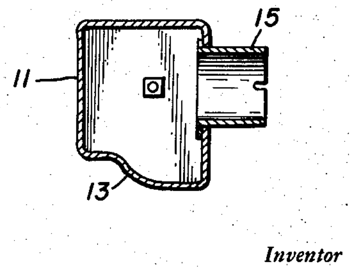
Figure 4 is a sectional view taken on the line 4—4 of Figure 3.
Figure 3:
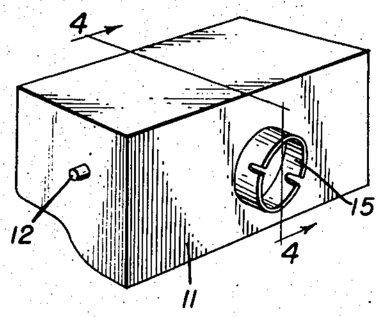
Figure 3 is an enlarged perspective view of the sliding trigger for opening and closing the circuit of the telephone.
Figure 2:
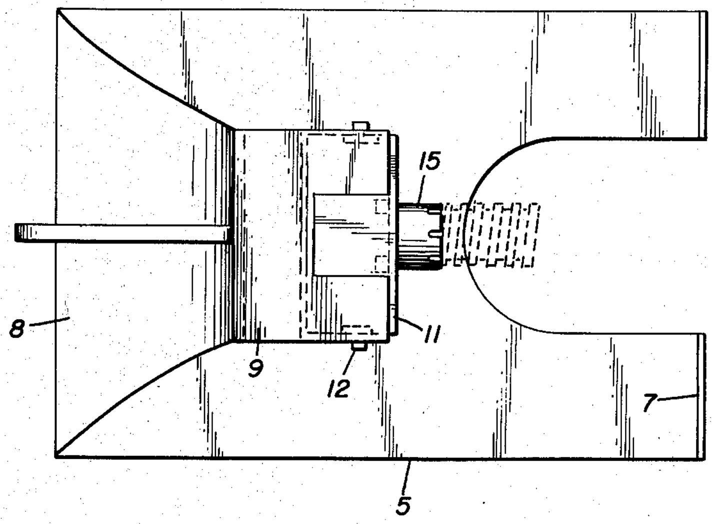
Figure 2 is a top plan view with the telephone removed from the base of the support.
Figure 6:
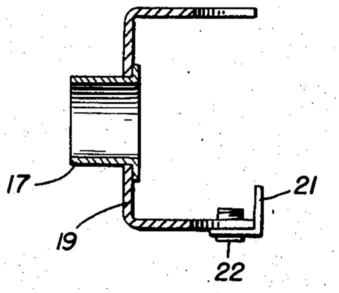
Figure 6 is a sectional view taken on the line 6—6 of Figure 5.
Figure 5:
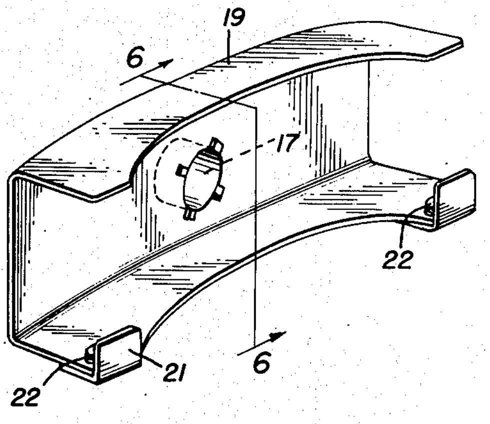
Figure 5 is an enlarged perspective view of the holder for the combined transmitter and receiver of the telephone.

Referring now to the drawings in detail wherein for the purpose of illustration we have disclosed a preferred embodiment of the invention, the numeral 5 designates the base of the device on which the base portion 6 of a conventional French type dial telephone is supported, the front edge of the base 5 being formed with upwardly extending flanges 7 positioned in front of the telephone base 6.

A standard 8 rises from the rear portion of the base 5 and is curved forwardly behind the back of the telephone, the standard 8 terminating at its upper end in a housing 9 which encloses the cradle in which the combined transmitter and receiver is usually mounted. The sides of the housing 9 are formed with horizontally extending slots 10.

A trip device in the form of a hollow, box-like structure 11 is provided at its opposite ends with trunnions 12 which are slidably received in the slots 10. The front ends of the housing 9 is open to receive the trip device 11 whereby to provide for a forwardly and rearwardly sliding movement of the trip device in the housing.

The bottom of the trip device 11 is curved upwardly toward its rear as shown at 13 and is adapted to ride on the usual circuit opening and closing bar 14 of the telephone 6, the bar 14 being depressed by the weight of the combined transmitter and receiver when placed in the cradle of the telephone and the bar is raised when the combined transmitter and receiver is removed to thus open and close the circuit in the usual manner.

A ferrule 15 projects forwardly from the front of the trip device 11 and to which the rear end of a flexible tubular arm 16 is suitably attached, the arm preferably comprising a flexible metal cable of conventional construction and bendable horizontally as well as vertically and having sufficient strength to support itself in its adjusted position.

The front end of the arm 16 is supported in a ferrule 17 by means of a set screw 18, the ferrule 17 projecting from the rear of a channel shaped holder 19 in which the combined transmitter and receiver 20 is positioned. One of the side edges of the holder 19 is provided adjacent each end with an inwardly projecting angle lug 21 secured to the holder by set screws 22 and which also engage the hand gripping portion 23 of the combined transmitter and receiver to hold the latter in position in the holder 19.

In the operation of the device, the telephone base 6 is seated on the base 5 and the combined transmitter and receiver secured in the holder 19 as shown in Figure 1.

The holder 19 and arm 16 are normally pushed inwardly to ride the inclined edge 13 of the trip device 11 over the bar 14 of the telephone to depress the latter and thus maintain the circuit open. When the telephone is in use, the holder 19 and arm 16 are pulled forwardly to release the bar 14 and the combined transmitter and receiver may then be used in the usual manner and the arm 16 adjusted vertically or horizontally to a desired position by the inherent strength of the arm.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A telephone support comprising a base for mounting a telephone thereon, a holder for the combined transmitter and receiver of the telephone, an arm supporting the holder, and a slidable connection between the arm and the base and including an inner end portion for the arm slidable back and forth on top of a telephone circuit maker and breaker for opening and closing the circuit for the telephone.

2. A telephone attachment comprising a telephone attaching member, an arm slidably connected to said attaching member and including an inner end portion positioned for sliding back and forth on top of a telephone circuit maker and breaker for opening and closing a circuit for the telephone, and a holder for a combined transmitter and receiver of the telephone carried by the outer end of the arm.

3. A telephone attachment comprising a telephone attaching member, a flexible arm, a trip at one end of the arm slidably connected to said attaching member and engaging a telephone circuit maker and breaker for opening and closing a circuit for the telephone, and a holder at the other end of the arm for supporting a combined telephone transmitter and receiver.

4. A telephone attachment comprising a telephone attaching member, a flexible arm, a trip at one end of the arm slidably connected to said attaching member and engaging a telephone circuit maker and breaker for opening and closing a circuit for the telephone, and a holder at the other end of the arm for supporting a combined telephone transmitter and receiver, said arm having universal adjusting movement and retained in its adjusted position by its inherent strength.

5. A telephone attachment comprising a telephone attaching member, a flexible tubular arm, a telephone switch actuating trip at one end of the arm slidably connected to said attaching mamber and arranged to open and close the circuit for the telephone by a predetermined sliding movement of the arm, and a holder at the other end of the arm for supporting a combined telephone transmitter and receiver, said arm having universal adjusting movement and retained in its adjusted position by its inherent strength.

6. A telephone support comprising a base positioned under a telephone and having an upwardly extending standard, a housing at the upper end of the standard and enclosing the cradle and switch bar of a French type telephone, a flexible tubular arm, a trip at the inner end of the arm slidably carried by said housing and engaging the switch bar to actuate the latter by a forward and rearward sliding movement of the arm, and a holder for a combined transmitter and receiver at the outer end of the arm.

7. A telephone support comprising a base positioned under a telephone and having an upwardly extending standard, a housing at the upper end of the standard and enclosing the cradle and switch bar of a French type telephone, a flexible tubular arm, a trip at the inner end of the arm slidably carried by said housing and engaging the switch bar to actuate the latter by a forward and rearward sliding movement of the arm, a channel shaped holder for a combined transmitter and receiver at the outer end of the arm, and means carried by the holder for clamping the transmitter and receiver therein.

MELROSE W. DE HART.
WALTER I. WHITE.

REFERENCES CITED

The following references are of record in the file of this patent:

UNITED STATES PATENTS

| Number | Name | Date |
|---|---|---|
| 2,020,527 | Swaine | Nov. 12, 1935 |
| 2,260,703 | Daly | Oct. 28, 1941 |
| 2,310,032 | Mathieson | Feb. 2, 1943 |

FOREIGN PATENTS

| Number | Country | Date |
|---|---|---|
| 221,123 | Switzerland | Sept. 16, 1942 |